(12) United States Patent
Miyazaki et al.

(10) Patent No.: US 10,882,105 B2
(45) Date of Patent: Jan. 5, 2021

(54) CONTROL METHOD AND DRIVE CONTROL APPARATUS OF HYDRAULIC INJECTION MOLDING MACHINE

(71) Applicant: NISSEI PLASTIC INDUSTRIAL CO., LTD., Nagano-ken (JP)

(72) Inventors: Hiroyuki Miyazaki, Nagano (JP); Satomi Sakaki, Nagano (JP); Kenichi Hayashi, Nagano (JP); Isamu Komamura, Nagano (JP)

(73) Assignee: NISSEI PLASTIC INDUSTRIAL CO., LTD., Nagano-ken (JP)

( * ) Notice: Subject to any disclaimer, the term of this patent is extended or adjusted under 35 U.S.C. 154(b) by 295 days.

(21) Appl. No.: 16/071,151

(22) PCT Filed: Dec. 22, 2017

(86) PCT No.: PCT/JP2017/046083
§ 371 (c)(1),
(2) Date: Jul. 19, 2018

(87) PCT Pub. No.: WO2018/117250
PCT Pub. Date: Jun. 28, 2018

(65) Prior Publication Data
US 2020/0164430 A1      May 28, 2020

(30) Foreign Application Priority Data
Dec. 22, 2016  (JP) ................................. 2016-249907

(51) Int. Cl.
*B29C 45/82* (2006.01)
*B22D 17/26* (2006.01)
(Continued)

(52) U.S. Cl.
CPC ............ *B22D 17/266* (2013.01); *B29C 33/24* (2013.01); *B29C 45/67* (2013.01); *B29C 45/82* (2013.01);
(Continued)

(58) Field of Classification Search
CPC ......... B29C 45/67; B29C 45/76; B29C 45/80; B29C 45/82
See application file for complete search history.

(56) References Cited

U.S. PATENT DOCUMENTS 5,219,584 A * 6/1993 Itsuzi ...................... B29C 45/67
                                                          264/40.5
5,529,478 A * 6/1996 Siegrist .................. B29C 45/67
                                                          425/150
(Continued)

FOREIGN PATENT DOCUMENTS

JP      5-285956 A    11/1993
JP      8-114203 A     5/1996
(Continued)

OTHER PUBLICATIONS

International Search Report, issued in PCT/JP2017/046083, dated Feb. 20, 2018.

*Primary Examiner* — James P Mackey
(74) *Attorney, Agent, or Firm* — Birch, Stewart, Kolasch & Birch LLP

(57) ABSTRACT

When the deceleration start point is reached, the meter-in side of the hydraulic driving actuator is subjected to a flow rate control to thereby start the deceleration control processing. The position to which the movable unit is moved is detected to use a speed instruction corresponding to the movement position to subject the hydraulic driving actuator to a meter-in control. The position to which the movable unit is moved is detected to calculate the moving speed of the movable unit. Based on the speed instruction, the moving (Continued)

speed is subjected to the feedback control using the meter-out control to the hydraulic driving actuator.

19 Claims, 7 Drawing Sheets

(51) Int. Cl.
*B29C 33/24* (2006.01)
*B29C 45/67* (2006.01)
*B29C 43/58* (2006.01)
*B29C 45/80* (2006.01)

(52) U.S. Cl.
CPC ...... *B29C 45/80* (2013.01); *B29C 2043/5808* (2013.01); *B29C 2945/76083* (2013.01); *B29C 2945/76227* (2013.01); *B29C 2945/76595* (2013.01); *B29C 2945/76705* (2013.01)

(56) References Cited

U.S. PATENT DOCUMENTS

| | | | | |
|---|---|---|---|---|
| 5,582,782 A | * | 12/1996 | Kato | ............... B29C 45/67 |
| | | | | 264/328.1 |
| 8,239,058 B2 | * | 8/2012 | Hakoda | ............... B29C 45/82 |
| | | | | 700/200 |
| 8,244,397 B2 | * | 8/2012 | Hakoda | ............... B29C 45/76 |
| | | | | 700/200 |
| 2009/0212453 A1 | | 8/2009 | Hakoda et al. | |
| 2009/0214688 A1 | | 8/2009 | Hakoda et al. | |

FOREIGN PATENT DOCUMENTS

| | | |
|---|---|---|
| JP | 11-235741 A | 8/1999 |
| JP | 2009-202365 A | 9/2009 |
| JP | 2009-202366 A | 9/2009 |
| JP | 2011-110700 A | 6/2011 |

* cited by examiner

CONTROL METHOD AND DRIVE CONTROL APPARATUS OF HYDRAULIC INJECTION MOLDING MACHINE

TECHNICAL FIELD

The present invention relates to a control method of and a drive control apparatus of a hydraulic injection molding machine preferably used for a control to drive a hydraulic driving actuator by a hydraulic pump to move a movable unit.

BACKGROUND ART

Generally, when a hydraulic injection molding machine is compared with an electric injection molding machine, it is difficult to provide accurate position control and speed control with the hydraulic injection molding machine. Specifically, in the case of the hydraulic injection molding machine, the use of hydraulic oil and a hydraulic driving actuator causes the hydraulic oil to have a varied viscosity or volume for example depending on the temperature and causes the hydraulic driving actuator to have an inertia force. These physical behaviors have a direct influence on the control accuracy and the responsiveness. When the hydraulic pump is a variable discharge-type hydraulic pump for which the rotation number of the pump motor can be changed to control a discharge flow rate, then a hydraulic circuit extending from the hydraulic pump to the hydraulic driving actuator tends to have an increased length, which significantly influences the variation of the viscosity or the volume of the hydraulic oil for example. For example, when it is assumed that the hydraulic driving actuator is a mold opening/closing cylinder provided on a mold clamping apparatus, even when the position is subjected to feedback control, the mold clamping position (metal mold closing position) or the mold closing time fluctuates depending on each shot and a movable mold collides with a fixed mold to cause troubles such as breakage or damage. This problem is more significant when it is desired that a mold closing speed is reduced to provide a shorter mold closing time (molding cycle time) in order to increase productivity.

In order to solve this problem, the present applicant has conventionally suggested a control method preferably used for a hydraulic mold clamping apparatus in Patent Literatures 1 and 2. Patent Literature 1 intends to provide a control method of a mold clamping apparatus to prevent the collision of metal molds even when a mold clamping step is performed at a higher speed, to exclude a factor causing the decline of the molding quality (homogenization) and a factor causing the variation of productivity, and to contribute to the cost reduction of a hydraulic circuit and a simple and smaller circuit configuration. Specifically, a predetermined speed control pattern is set so that a mold closing control is performed in a mold clamping step at a mold closing speed in a mold closing zone to sequentially predict by calculation for each predetermined time interval, based on the detected current mold closing speed and the current mold closing position, a deceleration start position of a deceleration zone at which the current mold closing speed is zero at a virtual stop position. The deceleration zone is started when this deceleration start position is reached. In this deceleration zone, a speed instruction value corresponding to the speed control pattern is sequentially calculated based on the detected current mold closing position. This speed instruction value is used to perform the deceleration control. When a mold clamping transition speed is reached, a predetermined mold clamping processing is performed via a low pressure/low speed zone.

Patent Literature 2 intends to provide a control method of a mold clamping apparatus by which the fluctuation of the mold opening position depending on each shot is reduced to securely prevent the unnecessary overrun of the mold for example to provide a fixed molding cycle time at a high speed. Specifically, a predetermined speed control pattern is set. During a mold opening control, a mold opening control is performed in a mold opening zone based on a mold opening speed. Based on the detected current mold opening speed and the current mold opening position, a deceleration start position of a deceleration zone in which the current mold opening speed is zero at a virtual stop position is sequentially predicted by calculation for each predetermined time interval. When this deceleration start position is reached, the deceleration zone is started. In this deceleration zone, the speed instruction value corresponding to the speed control pattern is sequentially calculated based on the detected current mold opening position. This speed instruction value is used to perform the deceleration control. When an end transition speed is reached, a predetermined stop control processing is performed.

CITATION LIST

Patent Literature

Patent Literature 1: Japanese Unexamined Patent Application Publication No. 2009-202365
Patent Literature 2: Japanese Unexamined Patent Application Publication No. 2009-202366

SUMMARY OF INVENTION

Technical Problem

In the case of the conventional control method of the mold clamping apparatus described above, a problem is still unsolved.

Specifically, a movable platen for supporting a movable mold in a mold clamping apparatus has a structure supported by four tie bars. The tie bars receive a substantial weight including that of the movable mold and the movable platen and thus are deflected downwardly. Thus, a problem is caused in which the movable platen cannot be smoothly slid and displaced. To prevent this, a structure is generally used to support the lower face of the movable platen by an upper face of a base for example. In a deceleration zone to perform a stop processing in a mold opening step and a mold closing step to move the movable platen, a speed control pattern is set based on which the deceleration processing is performed. However, since the lower face of the above-described movable platen contacts the upper face of the base, for example, this state (interfacial friction) functions as a braking function to some extent. Therefore, a normal deceleration processing can be performed even when the hydraulic driving actuator for moving the movable platen is subjected to a meter-in control as in Patent Literatures 1 and 2.

In the case of the mold clamping apparatus, however, a mold opening/closing operation is repeated to reciprocate the movable platen in each shot and, in a state in which the lower face of the movable platen contacts the upper face of the base for example (frictional contact state), the energy loss during the operation cannot be ignored and a declined control accuracy also has an adverse influence on the molding quality. Thus, from the viewpoint of excluding these defects, it is desired to reduce the frictional contact state to further reduce the load. However, such a reduction on the other hand eliminates the above-described braking function. Thus, the inertia force prevents an appropriate deceleration processing from being provided, thus undesirably causing an unstable control.

Specifically, in the case of the hydraulic driving actuator as shown in FIG. 7, the movement of the movable platen is decelerated until a set target position Xo is reached by using the speed control pattern to reduce the flow rate of the meter-in circuit at the deceleration start position Xs calculated based on preset deceleration time Td so that the deceleration control can be performed to trace the deceleration pattern Ps shown in FIG. 7. However, when the load to the movement of the movable platen is reduced, a failure to provide the braking function causes the inertia force of the movable platen to prevent a sufficient deceleration from being achieved in the deceleration zone Zd. This causes, as shown by the virtual line Pr shown in FIG. 7, the target position Xo to be overrun to excessively reach the position Xor and causes a longer reach time as shown by the deceleration time Tdx. This inevitably requires the entire molding cycle to be increased, which causes reduced productivity and mass productivity and also causes a reduced control accuracy and an unstable control to cause a fluctuated target position, which also has an adverse influence on the molding quality.

An action similar to that of the braking function also may be obtained by using the meter-out circuit to reduce the flow rate flowing out of the hydraulic driving actuator. However, this is not a sufficient solution because a compressed hydraulic force tends to cause a rapid deceleration, and the release of a hydraulic pressure tends to cause an overshoot, for example, and there is a risk that mechanical vibration may occur.

It is an objective of the present invention to provide a control method and a drive control apparatus of a hydraulic injection molding machine to solve the problem existing in the prior art as described above.

Solution to Problem

In order to solve the above-described problem, a control method of a hydraulic injection molding machine 1 according to the present invention is characterized in that a hydraulic pump 2 is used to drive a hydraulic driving actuator 3 to move a movable unit 4. When a deceleration start point Xs is reached during the movement of the movable unit 4, then a deceleration control processing is performed to stop the movable unit 4 at a set stop position Xe. When a set target position Xo is reached, a deceleration completion processing is performed. When the deceleration start point Xs is reached, the meter-in side of the hydraulic driving actuator 3 is subjected to a flow rate control to thereby start the deceleration control processing. A position to which the movable unit 4 is moved is detected to use a speed instruction corresponding to the movement position to subject the hydraulic driving actuator 3 to the meter-in control. The position to which the movable unit 4 is moved is detected to calculate the speed at which the movable unit 4 is moved. Based on the speed instruction, the moving speed is subjected to a feedback control based on the meter-out control to the hydraulic driving actuator 3.

On the other hand, in order to solve the above-described problem, a drive control apparatus C of the hydraulic injection molding machine 1 according to the present invention is characterized in that the hydraulic pump 2 is allowed to drive the hydraulic driving actuator 3 to move the movable unit 4. When the deceleration start point Xs is reached during the movement of the movable unit 4, the deceleration control processing is performed to stop the movable unit 4 at the set stop position Xe. When the set target position Xo is reached, then the deceleration completion processing is performed. The drive control apparatus includes a meter-in circuit 5 connected to the hydraulic driving actuator 3, a meter-out circuit 6 connected to the hydraulic driving actuator 3, and a control unit 7. The control unit 7 is configured, when at least the deceleration start point Xs is reached, the meter-in circuit 5 to the hydraulic driving actuator 3 is subjected to the flow rate control to thereby start the deceleration control processing. Then, the control unit 7 detects the position to which the movable unit 4 is moved and uses a speed instruction corresponding to the movement position to subject the meter-in circuit 5 to the meter-in control. The control unit 7 detects the position to which the movable unit 4 is moved to calculate the moving speed of the movable unit 4. Based on the speed instruction, the moving speed is subjected to a feedback control based on the meter-out control to the meter-out circuit 6.

Also according to a preferred embodiment of the present invention, the hydraulic driving actuator 3 can use a mold opening/closing cylinder 3c ... of a mold clamping apparatus 1c. The movable unit 4 can include a movable platen 4m to support a movable mold 4cm in the mold clamping apparatus 1c. The stop position Xe can include a regular stop position Xe or a virtual stop position Xes. Thus, the deceleration start point Xs sets a predetermined speed control pattern Dp in advance. The predetermined speed control pattern Dp includes a constant speed travel zone Zc in which the movable unit 4 is moved at a set moving speed, a deceleration travel zone Zd in which the speed is gradually reduced from the completion point (Xs) of this constant speed travel zone Zc, and a target position Xo at which this deceleration travel zone Zd is completed. In the actual constant speed travel zone Zc, the movable unit 4 is allowed to move at the set moving speed. Based on the detected moving speed and the movement position, a completion point (Xs) of the constant speed travel zone Zc can be set as the deceleration start point Xs. The completion point (Xs) of the constant speed travel zone Zc is a point at which the moving speed is zero at a virtual stop position Xes sequentially predicted by calculation for each predetermined time interval. In this manner, the speed instruction can be calculated from the detected position to which the movable unit 4 is moved based on the speed control pattern Dp.

Furthermore, the hydraulic pressure Pf of a front oil chamber 3cf ... of a mold opening/closing cylinder 3c ... in a mold closing direction Fc and the hydraulic pressure Pr of a rear oil chamber 3cr ... in a mold opening direction Fo of the mold opening/closing cylinder 3c ... are monitored. When the hydraulic pressure Pr of the rear oil chamber 3cr ... is higher than the hydraulic pressure Pf of the front oil chamber 3cf ... during the mold opening operation, then a control can be performed to add, to a feedback control speed instruction based on the meter-out control, a speed instruction having a magnitude corresponding to a differential pressure between the hydraulic pressure Pr of the rear oil chamber 3cr ... and the hydraulic pressure Pf of the front oil chamber 3cf .... The hydraulic pressure Pf of the front oil chamber 3cf ... in the mold closing direction Fc of the mold opening/closing cylinder 3c ..., the hydraulic pressure Pr of the rear oil chamber 3cr ... in the mold opening direction Fo of the mold opening/closing cylinder 3c . . . , and the discharge pressure Pp of the hydraulic pump 2 are monitored. When the hydraulic pressure Pf of the front oil chamber 3cf . . . is higher than the hydraulic pressure Pr of the rear oil chamber 3cr . . . and the hydraulic pressure Pf of the front oil chamber 3cf . . . is higher than the discharge pressure Pp of the hydraulic pump 2 during the mold closing operation, then a control can be performed to switch a pressure instruction in the pressure control loop of the meter-in control to have a magnitude of the hydraulic pressure Pf of the front oil chamber 3cf. . . . In addition, the hydraulic pressure Pf of the front oil chamber 3cf . . . in the mold closing direction Fc of the mold opening/closing cylinder 3c . . . is monitored. When the hydraulic pressure Pf is a negative pressure, a control can be performed to increase the flow rate in the meter-in control and to reduce the opening in the meter-in control. On the other hand, the mold clamping apparatus 1c is preferably a mold clamping apparatus that includes a movable unit support mechanism 11 that supports the movable unit 4 in a load state having a load based on the moving resistance related to the movement to have a magnitude equal to or lower than a fixed load magnitude. The movable unit support mechanism 11 may be configured to have a support face 11f to support the movable unit 4 so that the movable unit 4 can be directly slid by the contact state or may be configured to have a linear guide mechanism 11r to support the movable unit 4 in a slidable and displaceable manner. The meter-out circuit 6 desirably uses a flow rate control valve 13 that can use the meter-out control to variably control the flow rate. The hydraulic pump 2 is desirably a variable discharge-type hydraulic pump 2s for which, the rotation number of a pump motor 12 can be changed to thereby control the discharge flow rate.

Advantageous Effects of Invention

Remarkable effects as shown below are provided by the control method and the drive control apparatus C of the hydraulic injection molding machine 1 according to the present invention as described above.

(1) When the deceleration start point Xs is reached, then the meter-in side of the hydraulic driving actuator 3 is subjected to a flow rate control to thereby start the deceleration control processing. The position to which the movable unit 4 is moved is detected. A speed instruction corresponding to the movement position is used to thereby subject the hydraulic driving actuator 3 to the meter-in control and to calculate the moving speed of the movable unit 4. Based on the speed instruction, the moving speed is subjected to a feedback control based on the meter-out control to the hydraulic driving actuator 3. Thus, by improving the control accuracy and stability to the target position Xo related to the movement of the movable unit 4, the molding quality is improved. At the same time, the deceleration processing can be performed at a higher speed during the movement of the movable unit 4 to thereby reduce the molding cycle. The productivity and mass productivity can be improved. A load related to the movement of the movable unit 4 in particular can be reduced, thereby improving the energy saving.

(2) According to a preferred aspect, the hydraulic driving actuator 3 uses the mold opening/closing cylinder 3c . . . of the mold clamping apparatus 1c. The movable unit 4 includes the movable platen 4m for supporting the movable mold 4cm in the mold clamping apparatus 1c. This configuration can apply the control method according to the present invention to the mold clamping apparatus 1c to reciprocate, in each mold opening/closing operation, the movable unit 4 including the movable platen 4m and the movable mold 4cm having a heavy weight. Thus, this can be carried out as an optimal embodiment to provide the desired action and effect of the present invention.

(3) According to a preferred aspect, by allowing the stop position Xe to include the regular stop position Xe or the virtual stop position Xes, the general stop processing can be performed in a more versatile manner. The use of the virtual stop position Xes can provide, during the movement, the real-time prediction of an accurate target position Xo, thus providing diversified deceleration controls including reaching a more accurate target position Xo.

(4) According to a preferred aspect, when the deceleration start point Xs is set, a predetermined speed control pattern Dp is set in advance. The predetermined speed control pattern Dp includes a constant speed travel zone Zc in which the movable unit 4 is moved at a set moving speed, a deceleration travel zone Zd in which the speed is gradually reduced from the completion point (Xs) of this constant speed travel zone Zc, and a target position Xo at which this deceleration travel zone Zd is completed. In the actual constant speed travel zone Zc, the movable unit 4 is allowed to move at the set moving speed. Based on the detected moving speed and the movement position, a completion point (Xs) of the constant speed travel zone Zc can be set as the deceleration start point Xs. The completion point (Xs) of the constant speed travel zone Zc is a point at which the moving speed is zero at a virtual stop position Xes sequentially predicted by calculation for each predetermined time interval. This can consequently improve the control accuracy for the target position Xo and can dramatically reduce the fluctuation of the position and time of the movement of the movable unit 4. This can avoid, even when the movable unit 4 has a higher speed, troubles such as the overrun of the movable unit 4 and can eliminate a factor causing a declined molding quality (homogenization) and a factor causing a variation of productivity. Furthermore, since this can be realized by software processing, there is no need for additional hardware such as a brake bulb required for a braking operation or a related circuit element. This can contribute to a hydraulic circuit having a reduced cost and a simpler and smaller circuit configuration.

(5) According to a preferred aspect, the speed instruction is calculated from the detected position to which the movable unit 4 is moved based on the speed control pattern Dp. Thus, during the movement control including deceleration, a speed instruction for accurately tracing the speed control pattern Dp can be set, thus always providing an accurate speed instruction having little fluctuation.

(6) According to a preferred aspect, the hydraulic pressure Pf of the front oil chamber 3cf . . . in the mold closing direction Fc of the mold opening/closing cylinder 3c . . . and the hydraulic pressure Pr of the rear oil chamber 3cr . . . in the mold opening direction Fo of the mold opening/closing cylinder 3c . . . are monitored. When the hydraulic pressure Pr of the rear oil chamber 3cr . . . is higher than the hydraulic pressure Pf of the front oil chamber 3cf . . . during the mold opening operation, then a control can be performed to add, to the feedback control speed instruction based on the meter-out control, a speed instruction having a magnitude corresponding to a differential pressure between the hydraulic pressure Pr of the rear oil chamber 3cr . . . and the hydraulic pressure Pf of the front oil chamber 3cf. . . . This can consequently eliminate the unnecessary differential pressure caused in the rear oil chamber 3cr . . . during the mold opening, thus avoiding troubles such as the damage of the mold opening/closing cylinder 3c . . . and suppressing a rapid behavior change.

(7) According to a preferred aspect, the hydraulic pressure Pf of the front oil chamber 3cf . . . in the mold closing direction Fc of the mold opening/closing cylinder 3c . . . , the hydraulic pressure Pr of the rear oil chamber 3cr . . . in the mold opening direction Fo of the mold opening/closing cylinder 3c . . . , and the discharge pressure Pp of the hydraulic pump 2 are monitored. When the hydraulic pressure Pf of the front oil chamber 3cf . . . is higher than the hydraulic pressure Pr of the rear oil chamber 3cr . . . and the hydraulic pressure Pf of the front oil chamber 3cf . . . is higher than the discharge pressure Pp of the hydraulic pump 2 during the mold closing operation, then a control can be performed to switch a pressure instruction in the pressure control loop of the meter-in control to a magnitude of the hydraulic pressure Pf of the front oil chamber 3cf . . . . This can consequently reduce the unnecessary differential pressure caused in the front oil chamber 3cf . . . during the mold closing, thus solving a defect in which an excessively-high load causes an insufficient drive force.

(8) According to a preferred aspect, the hydraulic pressure Pf of the front oil chamber 3cf . . . in the mold closing direction Fc of the mold opening/closing cylinder 3c . . . is monitored. When the hydraulic pressure Pf is a negative pressure, the flow rate in the meter-in control is increased and a control is performed to reduce the opening in the meter-in control. This can consequently solve the temporal increase or decrease of the flow rate due to the negative pressure, thus avoiding a defect in which the movable platen 4m during the movement is undesirably stopped, for example.

(9) According to a preferred aspect, the mold clamping apparatus 1c is a mold clamping apparatus that includes the movable unit support mechanism 11 that supports the movable unit 4 in a load state having a load based on the moving resistance related to the movement having a magnitude equal to or lower than a fixed load magnitude. The movable unit support mechanism 11 can be provided that allows the movable unit 4 to move in a low load state. This can improve the energy saving and can allow the mold opening/closing control to be performed accurately and stably during the movement of the movable platen 4m for supporting the movable mold 4cm.

(10) According to a preferred aspect, the movable unit support mechanism 11 is configured to have the support face 11f to support the movable unit 4 so that the movable unit 4 can be directly slid by the contact state. In particular, the versatile movable unit support mechanism 11 can be configured in consideration of a simpler and lower-cost configuration.

(11) According to a preferred aspect, the movable unit support mechanism 11 is configured to include the linear guide mechanism 11r that supports the movable unit 4 in a slidable and displaceable manner. This can consequently cope with a low load state in which substantially no load is caused by the linear guide mechanism 11r. Thus, this type of linear guide mechanism 11r can be used and the most desirable energy saving effects can be obtained.

(12) According to a preferred aspect, the meter-out circuit 6 uses the flow rate control valve 13 that can use the meter-out control to variably control the flow rate. This can provide the use of a proportional electromagnetic valve or a servo valve that can perform a highly-accurate flow rate control, for example, thus realizing a control having high responsiveness accuracy.

(13) According to a preferred aspect, the hydraulic pump 2 uses the variable discharge-type hydraulic pump 2s by which the pump motor 12 can have a variable rotation number to thereby control the discharge flow rate. As a result, the meter-in control can be performed based on the inverter control to the hydraulic pump 2, thus eliminating the need for an additional meter-in circuit. This can consequently contribute to a reduced cost and a further-improved energy saving. In particular, the control method according to the present invention can be effectively applied to the mold clamping apparatus 1c including the variable discharge-type hydraulic pump 2s that is highly influenced by the physical variation such as the temperature of the hydraulic oil as described above to obtain a greater effect.

REFERENCE SIGNS LIST

1: hydraulic injection molding machine, 1c: mold clamping apparatus, 2: hydraulic pump, 2s: variable discharge-type hydraulic pump, 3: hydraulic driving actuator, 3c . . . : mold opening/closing cylinder, 3cf . . . : front oil chamber in mold opening/closing cylinder, 3cr . . . : rear oil chamber in mold opening/closing cylinder, 4: movable unit, 4m: movable platen, 4cm: movable mold, 5: meter-in circuit, 6: meter-out circuit, 7: control unit, 11: movable unit support mechanism, 11f: support face, 11r: linear guide mechanism, 12: pump motor, 13: flow rate control valve, C: drive control apparatus, Xs: deceleration start point, (Xs): completion point of constant speed travel zone, Xe: stop position, Xes: virtual stop position, Xo: target position, Zc: constant speed travel zone, Zd: deceleration travel zone, Dp: speed control pattern, Fc: mold closing direction, Fo: mold opening direction

DESCRIPTION OF EMBODIMENTS

Next, the following section will describe the best embodiment according to the present invention in detail with reference to the drawings.

Figure 2:
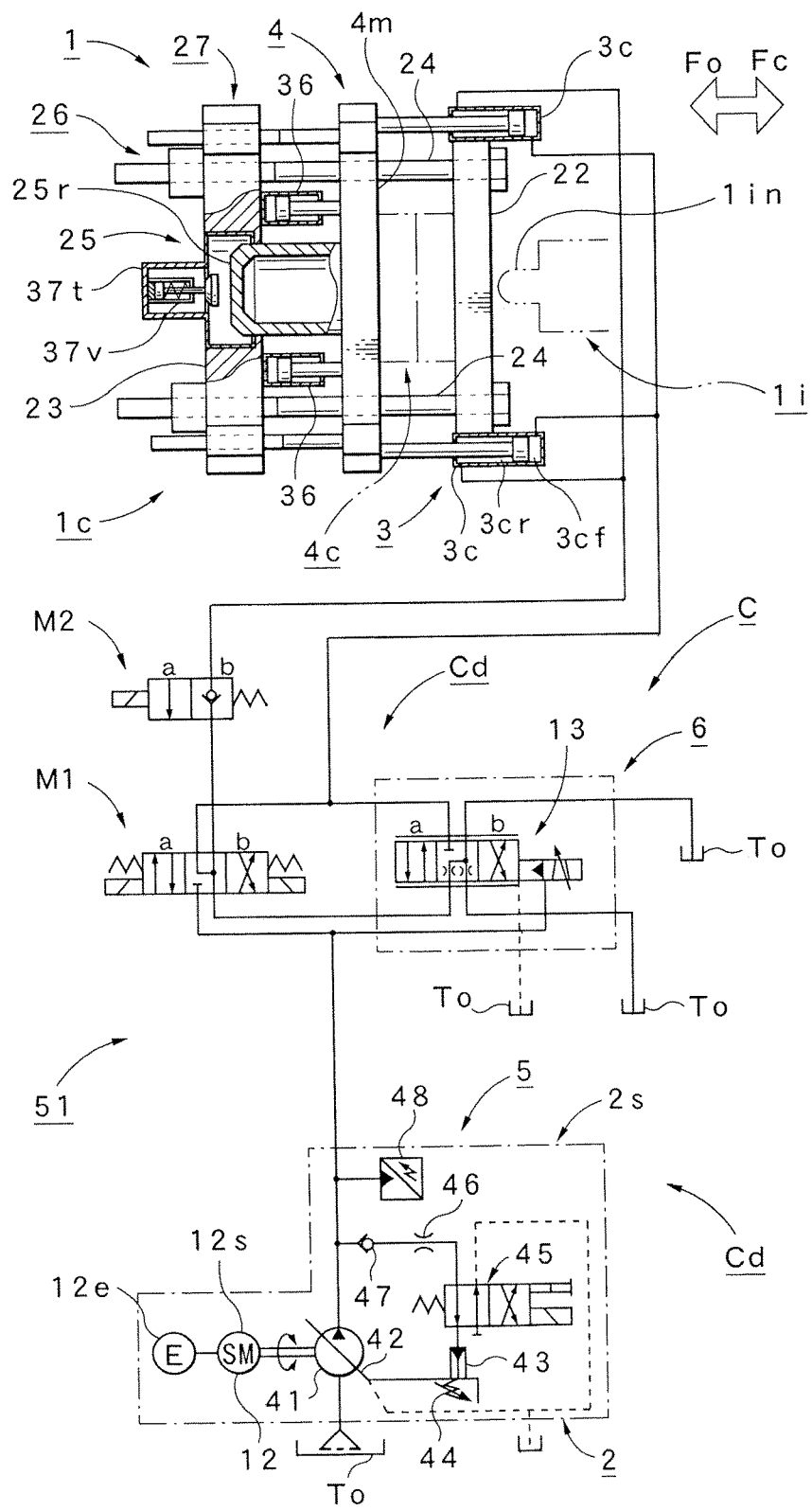
FIG. 2 is a hydraulic circuit diagram illustrating a drive control apparatus provided in the hydraulic injection molding machine according to a preferred embodiment of the present invention.
Figure 3:
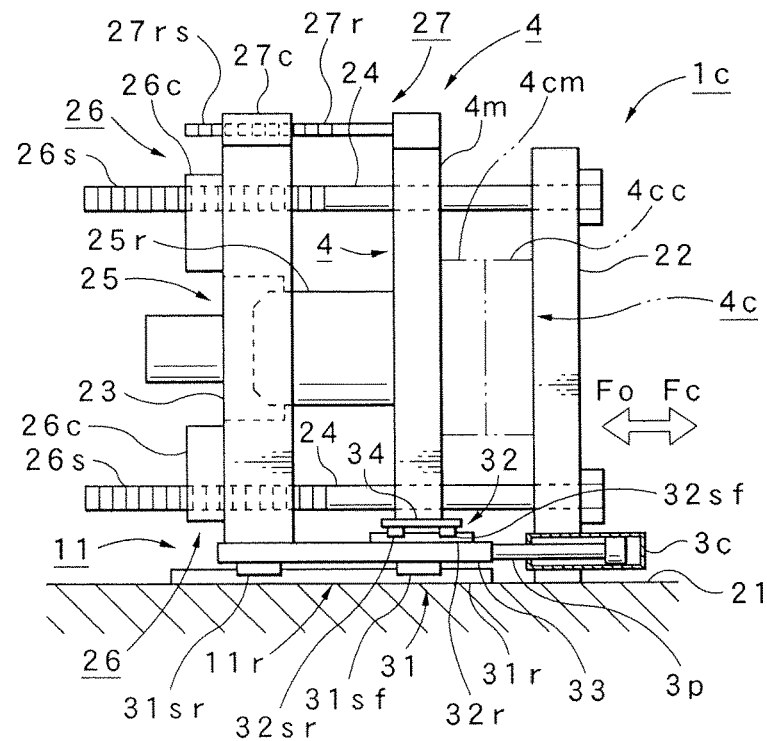
FIG. 3 is a mechanical configuration diagram illustrating a mold clamping apparatus including a movable unit support mechanism in the hydraulic injection molding machine.
Figure 4:
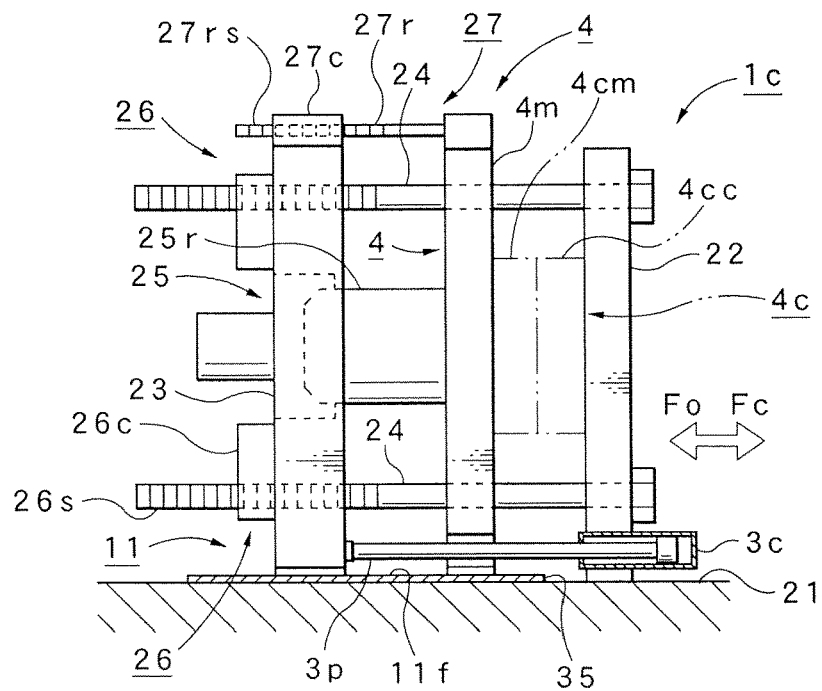
FIG. 4 is a mechanical configuration diagram illustrating the mold clamping apparatus including another movable unit support mechanism in the hydraulic injection molding machine.

First, the following section will describe the configuration of the mold clamping apparatus 1c provided in a preferred hydraulic injection molding machine 1 using the control method according to this embodiment with reference to FIG. 2 to FIG. 4.

In FIG. 2, the reference numeral 1 denotes a hydraulic injection molding machine that includes the mold clamping apparatus 1c and an injection apparatus 1i a part of which is shown by the virtual line. FIG. 3 and FIG. 4 illustrate the mold clamping apparatus 1c . . . preferably using the control method according to this embodiment (in particular, two types of mold clamping apparatuses 1c and 1c including different movable unit support mechanisms 11 . . . ), respectively.

The mold clamping apparatus 1c shown in FIG. 3 has a basic configuration including a stationary platen 22 fixed on a molding machine bed 21, a pressure-receiving platen 23 and the movable platen 4m provided on the upper face of the molding machine bed 21, the pressure-receiving platen 23 and the movable platen 4m is supported by the movable unit support mechanism 11 to be displaceable in the mold opening direction Fo and the mold closing direction Fc, and a plurality of tie bars 24 . . . (or four tie bars 24 . . . in this example) that are provided between the stationary platen 22 and the pressure-receiving platen 23 and one end of the tie bars 24 . . . is fixed to the stationary platen 22 and the other end of the tie bars 24 . . . is inserted to the pressure-receiving platen 23. The stationary platen 22 supports a fixed mold 4cc shown by the virtual line. The movable platen 4m supports the movable mold 4cm shown by the virtual line. The fixed mold 4cc and the movable mold 4cm constitute a metal mold 4c. In this manner, the movable platen 4m supporting the movable mold 4cm functions as the movable unit 4 in the present invention. As shown in FIG. 2, the pressure-receiving platen 23 has a mold clamping cylinder 25. This mold clamping cylinder 25 includes therein a drive ram 25r connected to the movable platen 4m.

The pressure-receiving platen 23 and the tie bar 24 . . . have therebetween the first lock mechanism 26 . . . for each tie bar 24 . . . . An arbitrary first lock mechanism 26 (and other first lock mechanisms 26 . . . ) include a to-be-locked part 26s formed in a predetermined range from the other end of the tie bar 24 in the axial direction and a locking part 26c provided in the pressure-receiving platen 23. By switching this locking part 26c to a lock mode or a lock cancellation mode, the arbitrary position of the to-be-locked part 26s and the position of the pressure-receiving platen 23 can be locked or lock-cancelled.

The pressure-receiving platen 23 and the movable platen 4m have therebetween a plurality of the second lock mechanisms 27 . . . . The illustrated arbitrary the second lock mechanism 27 (and other second lock mechanisms 27 . . . ) include a to-be-locked rod 27r having a to-be-locked part 27rs formed in the predetermined range having one end fixed to the movable platen 4m and the other end in the axial direction, and a locking part 27c provided in the pressure-receiving platen 23. By switching the locking part 27c to the lock mode or the lock cancellation mode, the arbitrary position of the to-be-locked part 27rs (i.e., the arbitrary position of the movable platen 4m) and the position of the pressure-receiving platen 23 can be locked or lock-cancelled.

On the other hand, the movable unit support mechanism 11 provided on the upper face of the molding machine bed 21 has a function to support the load due to the moving resistance by the movement of the movable platen 4m in a load state to have a magnitude equal to or lower than a fixed magnitude. This can allow the movable platen 4m supporting the movable mold 4cm as a heavy load in particular to move in a low load state, thus reducing the energy loss due to the frictional resistance, for example, and improving the energy saving.

The movable unit support mechanism 11 shown in FIG. 3 uses the linear guide mechanism 11r and is composed of a combination of a relatively-large main linear guide 31 and a relatively-small sub linear guide 31. Specifically, the movable unit support mechanism 11 includes a main guide rail 31r consisting of a pair of left and right rail members provided on the upper face of the molding machine bed 21, the main linear guide 31 that is slidably supported along the main guide rail 31r and that consists of a pair of left and right slider members attached to the lower face of a main frame 33, a sub guide rail 32r consisting of a pair of left and right rail members provided at the mold closing direction Fc side of the upper face the main frame 33, and a sub front slider 32sf and a sub rear slider 32sr that are slidably supported along this sub guide rail 32r and that consist of a pair of left and right slider members attached to the lower face of the sub frame 34.

The pressure-receiving platen 23 is provided and fixed at the mold opening direction Fo side of the upper face side of the main frame 33. The movable platen 4m is provided and fixed on the upper face of the sub frame 34. In this manner, the movable unit support mechanism 11 is configured to include the linear guide mechanism 11r to support the movable unit 4 in a slidable and displaceable manner. This can consequently cope with a low load state in which substantially no load is caused by the linear guide mechanism 11r in particular. Thus, this type of linear guide mechanism 11r can be used and the most desirable energy saving effect can be obtained.

A pair of left and right mold opening/closing cylinders 3c, 3c (see FIG. 2) is fixed to the stationary platen 22. A tip end of a piston rod 3p . . . protruding from each mold opening/closing cylinder 3c, 3c is connected and fixed to the main frame 33. The mold opening/closing cylinder 3c . . . constitutes the hydraulic driving actuator 3 of the present invention.

As described above, the hydraulic driving actuator 3 uses the mold opening/closing cylinder 3c . . . of the mold clamping apparatus 1c. The movable unit 4 uses the movable platen 4m to support the above-described the movable mold 4cm. This configuration can apply the control method according to the present invention to the mold clamping apparatus is to reciprocate, in each mold opening/closing operation, the movable unit 4 including the movable platen 4m and the movable mold 4cm having a heavy weight. Thus, this can be carried out as an optimal embodiment to provide the desired action and effect of the present invention.

Thus, in the mold opening step, the first lock mechanism 26 is switched to the lock cancellation mode, the second lock mechanism 27 is switched to the lock mode and the mold opening/closing cylinders 3c, 3c are driven in the mold opening direction Fo. Thus, a high-speed mold opening operation can be performed to move and slide the movable platen 4m and the pressure-receiving platen 23 in an integrated manner.

In the mold closing step, the first lock mechanism 26 is maintained in a lock cancellation mode and the second lock mechanism 27 is maintained in a lock mode during which the mold opening/closing cylinders 3c, 3c are driven in the mold closing direction Fc. Thus, a high-speed mold opening operation can be performed to move and slide the movable platen 4m and the pressure-receiving platen 23 in an integrated manner. When the movable platen 4m and the pressure-receiving platen 23 are moved to a predetermined mold closing position, then the stop processing (deceleration processing) is performed. In the mold clamping step, the first lock mechanism 26 is switched to the lock mode, the second lock mechanism 27 is switched to the lock cancellation mode, and the mold clamping cylinder 25 is driven. The pressure-receiving platen 23 has a fixed position and the movable platen 4m can be slid and displaced, thus providing a high pressure mold clamping operation.

On the other hand, the mold clamping apparatus 1c shown in FIG. 4 has the same basic configuration as that of the mold clamping apparatus 1c shown in FIG. 3 but is different therefrom in that the movable unit support mechanism 11 has a low-friction plate 35 having the low-friction support face 11f provided on the upper face of the molding machine bed 21 and the tie bar 24 . . . is used to support and guide the movable platen 4m. Thus, the same parts in FIG. 4 as those of FIG. 3 are denoted with the same reference numerals to clearly show the configurations and the details will not be further described.

The movable unit support mechanism 11 shown in FIG. 3 is configured so that the lower face of the movable platen 4m is supported by the upper face of the support face 11f to be directly slidable by the contact state. The lower face of the pressure-receiving platen 23 is also similarly supported by the upper face of the support face 11f to be directly slidable. On the other hand, the tip end of the piston rod 3p . . . protruding from a pair of left and right mold opening/closing cylinders 3c, 3c supported by the stationary platen 22 is fixed by being inserted to an opening provided in the movable platen 4m to be connected to the pressure-receiving platen 23. This can consequently provide the operation similar to that of the mold clamping apparatus 1c shown in FIG. 4. As described above, the movable unit support mechanism 11 is configured so that the movable unit 4 is supported by the support face 11f to be directly slidable by the contact state. This can particularly provide an advantage that the versatile movable unit support mechanism 11 can be configured to have a simpler configuration and cost effectiveness.

Regarding the mold clamping apparatus 1c shown in FIG. 2, the reference numerals 36, 36 represent an auxiliary cylinder and the reference numeral 37v represent a prefill valve provided in a sub tank 37t, respectively. The injection apparatus 1i has a function to allow the injection nozzle 1in to have a nozzle touch with the metal mold 4c (the fixed mold 4cc) to thereby inject molten resin in the cavity of the metal mold 4c so that the cavity is filled with the resin.

Figure 5:
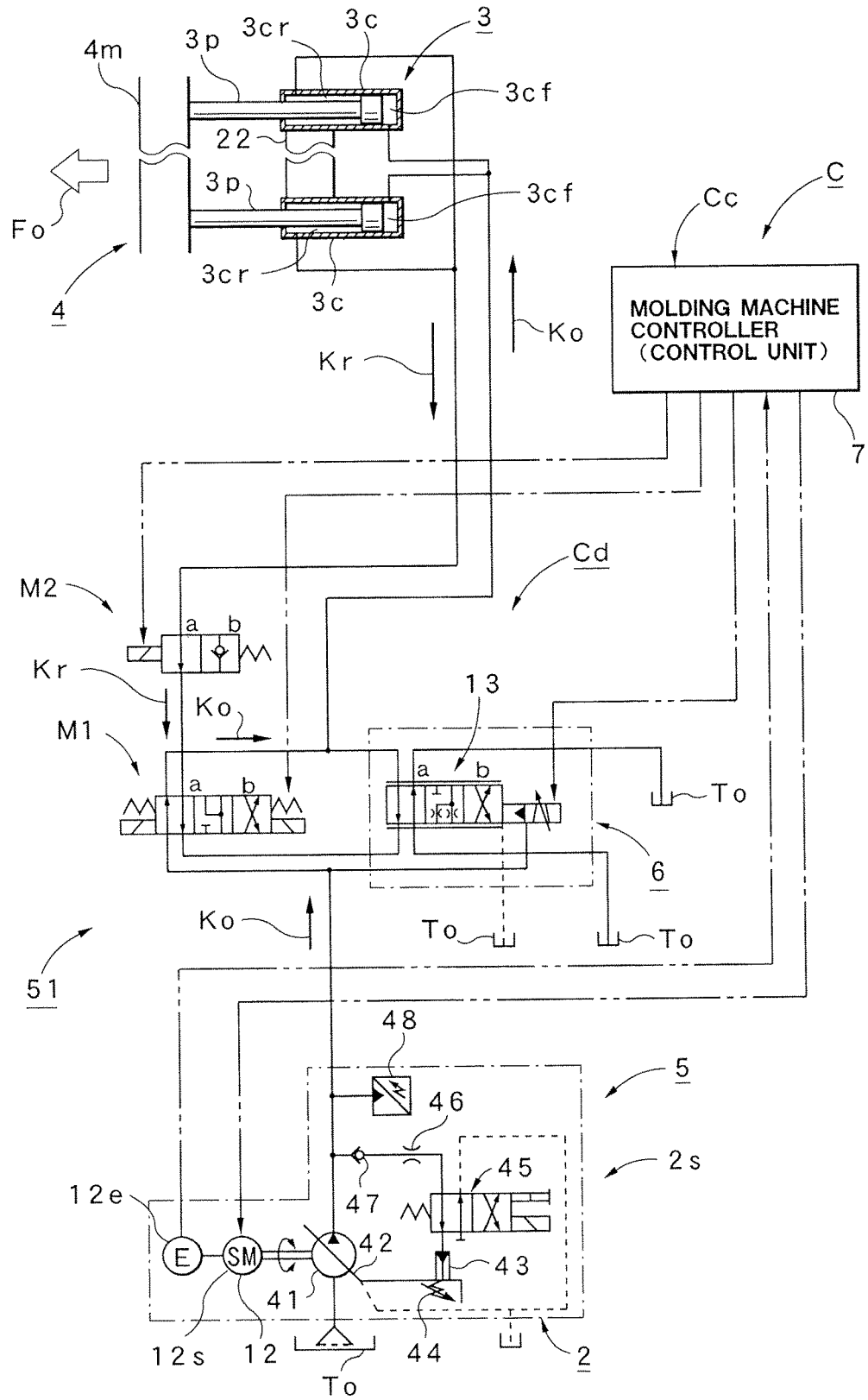
FIG. 5 is a hydraulic circuit diagram illustrating a valve switching status of the drive control apparatus of the hydraulic injection molding machine during the mold opening operation.

Next, the following section will describe the configuration of the drive control apparatus C according to this embodiment used in the mold clamping apparatus 1c with reference to FIG. 2 and FIG. 5.

The drive control apparatus C is mainly composed of a hydraulic driving unit Cd shown in FIG. 2 to drive the mold clamping apparatus 1c and the control unit 7 (the molding machine controller Cc) shown in FIG. 5 to control this hydraulic driving unit Cd.

First, the following section will describe the configuration of the hydraulic driving unit Cd. The hydraulic driving unit Cd includes the hydraulic pump 2 consisting of a hydraulic driving source and a hydraulic circuit 51 receiving hydraulic oil discharged from the hydraulic pump 2.

First, the following section will describe the configuration of the hydraulic pump 2. The hydraulic pump 2 to be used here is the variable discharge-type hydraulic pump 2s (hereinafter simply referred as the hydraulic pump 2s). As shown in FIG. 2, the hydraulic pump 2s includes a pump body 41 and a servo motor 12s (the pump motor 12) to drive the pump body 41 to rotate. The servo motor 12s is an AC servo motor connected to the output port of a molding machine controller Cc. The servo motor 12s has a rotary encoder 12e to detect the rotation number of this servo motor 12s. This rotary encoder 12e is connected to an input port of the molding machine controller Cc.

The pump body 41 is configured by a swash plate-type piston pump. Thus, the pump body 41 has a swash plate 42. The swash plate 42 having an increased inclination angle (swash plate angle) causes the pump piston in the pump body 41 to have an increased stroke and an increased discharge flow rate. A decreased swash plate angle causes the pump piston to have a reduced stroke and a reduced discharge flow. Thus, by setting the swash plate angle to have a predetermined angle, a fixed discharge flow rate can be set by which the discharge flow rate is fixed to have a predetermined magnitude. The swash plate 42 has a control cylinder 43 and a return spring 44. The control cylinder 43 is connected to the discharge opening of the pump body 41 via a switching valve (electromagnetic valve) 45, a throttle 46, and a check valve 47. This allows the angle of the swash plate 42 (swash plate angle) to be changed by the control of the control cylinder 43. The reference numeral 48 denotes a pump pressure sensor (discharge pressure sensor).

The suction opening of the pump body 41 is connected to an oil tank 49. The discharge opening of the pump body 41 is connected to the hydraulic circuit 51 (which will be described later). The variable discharge-type hydraulic pump 2s as described above can provide the servo motor 12s having a variable rotation number to control the discharge flow rate (i.e., can variably control the flow rate of the hydraulic oil flowing into the mold opening/closing cylinders 3c, 3c) and thus substantially functions as the meter-in circuit 5.

As described above, by allowing the hydraulic pump 2 to use the hydraulic pump 2s that can provide the pump motor 12 (the servo motor 12s) having a variable rotation number to thereby control the discharge flow rate, the hydraulic pump 2 can be subjected to an inverter control to perform the meter-in control, thus eliminating the need for an additional meter-in circuit. This can contribute to a reduced cost and further-improved energy saving. In particular, the control method according to the present invention can be advantageously applied to the mold clamping apparatus 1c including such a hydraulic pump 2s highly influenced by the physical variation such as a hydraulic oil temperature to gain a greater effect.

Next, the following section will describe the configuration of the hydraulic circuit 51 that receives hydraulic oil discharged from the hydraulic pump 2s.

The hydraulic circuit 51 includes an electromagnetic direction switching valve M1 for switching the main operation, an electromagnetic check valve M2, the flow rate control valve 13 including a throttle, and an oil tank To . . . that are connected as shown in FIG. 2 to constitute the hydraulic circuit 51. In this case, the flow rate control valve 13 can variably control the flow rate of the hydraulic oil flowed from the mold opening/closing cylinders 3c, 3c and thus functions as the meter-out circuit 6. Although the flow rate control valve 13 shown in FIG. 2 is illustrated as a proportional electromagnetic valve, the flow rate control valve 13 also may be a servo valve that can provide a more accurate control for example. As described above, the meter-out circuit 6 is configured to use the flow rate control valve 13 that can variably control the flow rate based on the meter-out control. This can consequently provide the use of a proportional electromagnetic valve or a servo valve, for example, that can provide an accurate flow rate control, thus providing an advantage of realizing a control having high responsiveness and accuracy.

Next, the following section will describe the molding machine controller Cc constituting the control unit 7 which controls the hydraulic pump 2 and the hydraulic circuit 51 having the configuration as described above with reference to FIG. 5.

The molding machine controller Cc has a function to control the entirety of the hydraulic injection molding machine 1. Regarding the relation with the drive control apparatus C according to this embodiment in particular, the molding machine controller Cc functions as the control unit 7. Thus, the electromagnetic direction switching valve M1, the electromagnetic check valve M2, and the flow rate control valve 13 constituting the hydraulic circuit 51 as shown in FIG. 5 are connected to the output port of the molding machine controller Cc, respectively. As described above, the servo motor 12s included in the hydraulic pump 2s is connected to the output port of the molding machine controller Cc. The rotary encoder 12e is connected to the input port of the molding machine controller Cc.

Figure 1:
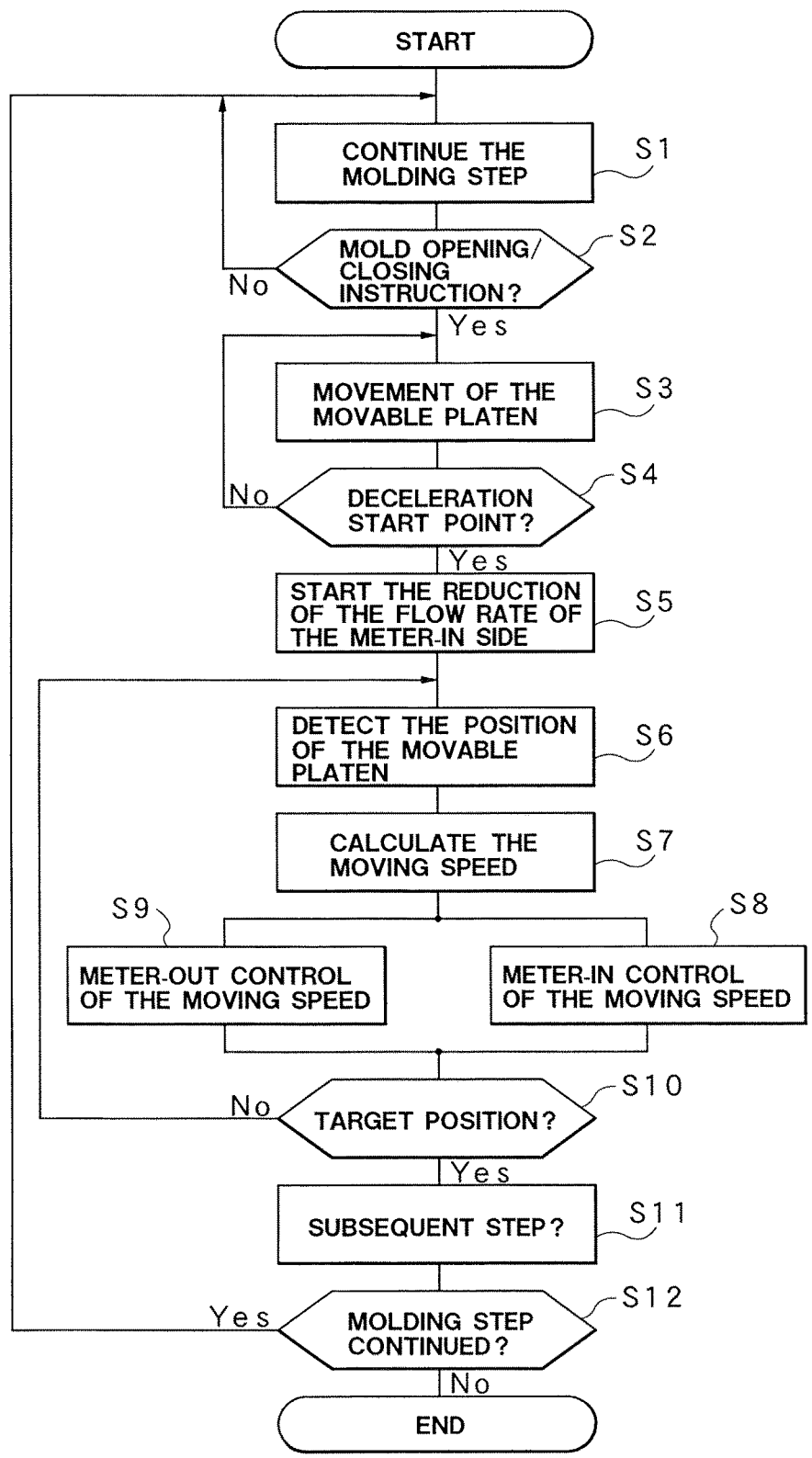
FIG. 1 is a flowchart for explaining the processing procedure of the control method of the hydraulic injection molding machine according to a preferred embodiment of the present invention.

Next, the following section will describe the control method according to this embodiment including the mold opening/closing operation in the mold clamping apparatus 1c having the configuration as described above with reference to FIG. 5 and FIG. 6 based on the flowchart shown in FIG. 1.

Figure 7:
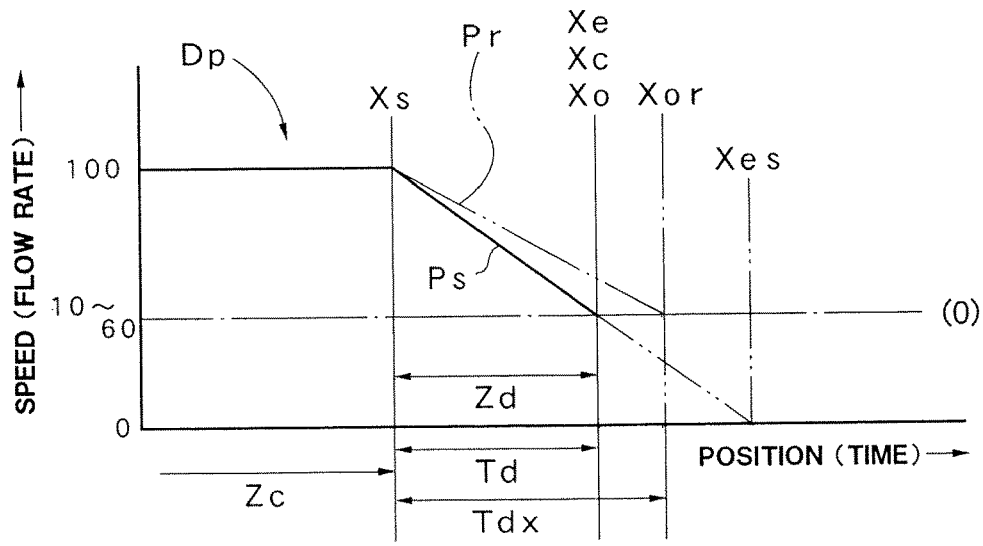
FIG. 7 illustrates a speed control pattern used for the control method of the hydraulic injection molding machine.

In the mold opening/closing operation, it is assumed that the speed control pattern Dp is set as an example as shown in FIG. 7 in advance. The speed control pattern Dp includes the constant speed travel zone Zc to move the movable platen 4m based on a set predetermined moving speed, the deceleration travel zone Zd in which the speed is gradually decelerated from the completion point (Xs) of this constant speed travel zone Zc, and the virtual stop position Xes at which this deceleration travel zone Zd is completed. Although not shown, a detection means required for the control such as a position sensor and timer is provided to detect the movement position and the movement time, for example, of the movable platen 4m.

Figure 6:
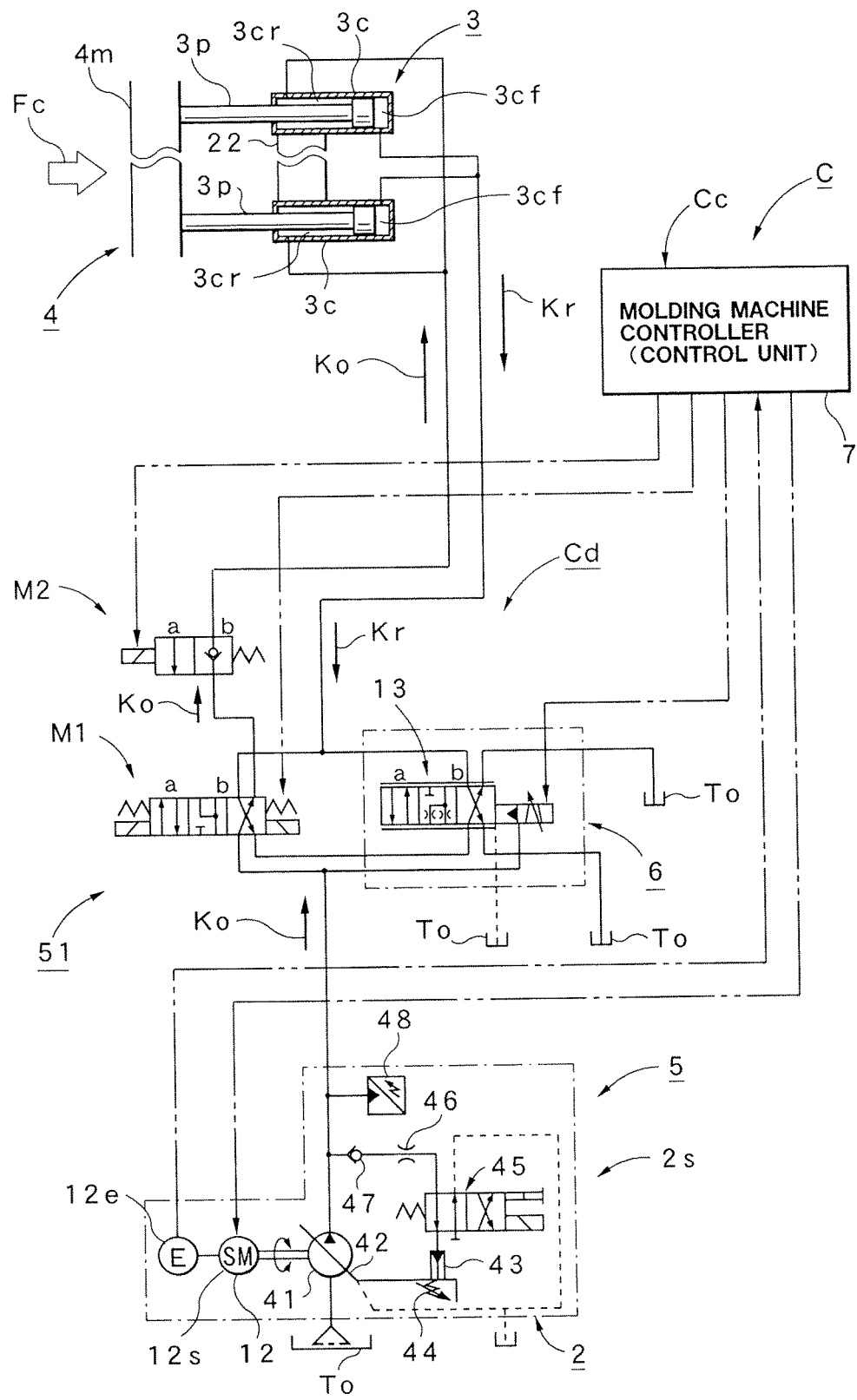
FIG. 6 is a hydraulic circuit diagram illustrating the valve switching status of the drive control apparatus of the hydraulic injection molding machine during the mold closing operation.

First, the following section will describe the operation of the constant speed travel zone Zc shown in FIG. 7 in the mold opening step and the mold closing step with reference to FIG. 5 and FIG. 6. FIG. 5 illustrates the switching state of the hydraulic circuit 51 in the mold opening step. FIG. 6 illustrates the switching state of the hydraulic circuit 51 in the mold closing step.

First, in the mold opening step, as shown in FIG. 5, based on a valve switching signal given from the molding machine controller Cc, the flow rate control valve 13 is switched to a symbol a, the electromagnetic direction switching valve M1 is switched to the symbol a, and the electromagnetic check valve M2 is switched to the symbol a, respectively. As a result, the hydraulic oil discharged from the hydraulic pump 2s is allowed to flow in the direction Ko shown by the arrow in FIG. 5 to flow, via the symbol a of the electromagnetic direction switching valve M1, into the front oil chambers 3cf, 3cf of the mold opening/closing cylinders 3c, 3c, thereby moving the drive piston rod in the mold opening direction Fo. The hydraulic oil flowed from the rear oil chambers 3cr, 3cr of the mold opening/closing cylinders 3c, 3c is allowed to flow in the direction Kr shown by the arrow in FIG. 5. Then, the hydraulic oil is allowed to flow, via the symbol a of the electromagnetic check valve M2, the symbol a of the electromagnetic direction switching valve M1, and the symbol a of the flow rate control valve 13, into a hydraulic oil supply line leading to the front oil chambers 3cf, 3cf of the mold opening/closing cylinders 3c, 3c. Thus, the constant speed travel zone Zc subjects the moving speed to a feedback control so that the set mold opening speed is reached.

On the other hand, the mold closing step uses the valve switching signal given from the molding machine controller Cc as shown in FIG. 6 to switch the flow rate control valve 13 to a symbol b, to switch the electromagnetic direction switching valve M1 to the symbol b, and to switch the electromagnetic check valve M2 to the symbol b, respectively. As a result, the hydraulic oil discharged from the hydraulic pump 2s is allowed to flow in the direction Ko shown by the arrow in FIG. 6. Then, the hydraulic oil is allowed to flow, via the symbol b of the electromagnetic direction switching valve M1 and the symbol b of the electromagnetic check valve M2, respectively, into the rear oil chambers 3cr, 3cr of the mold opening/closing cylinders 3c, 3c to thereby move the drive piston rod in the mold closing direction Fc.

The hydraulic oil flowed from the front oil chambers 3cf, 3cf of the mold opening/closing cylinders 3c, 3c is allowed in FIG. 6 to flow in the direction Kr shown by the arrow and is discharged into the oil tank To via the symbol b of the electromagnetic direction switching valve M1 functioning as the first path and the symbol b of the flow rate control valve 13. Then, the oil is discharged into the oil tank To via the symbol b of the flow rate control valve 13 functioning as the second path. Thus, the constant speed travel zone Zc subjects the moving speed to the feedback control so that the set mold closing speed is reached.

Next, the following section will specifically describe the control method of the deceleration travel zone Zd as a main part of the present invention based on the flowchart shown in FIG. 1.

It is now assumed that a predetermined product is continuously subjected to the molding step in the hydraulic injection molding machine 1 (Step S1). Then, the processing proceeds to the mold opening step or the mold closing step to assume a case where a mold opening instruction or a mold closing instruction is outputted (Step S2). As a result, the mold opening/closing cylinders 3c, 3c are driven to move the movable platen 4m supporting the movable mold 4cm in the mold opening direction Fo or the mold closing direction Fc. The movement is constant speed-controlled by the above-described constant speed travel zone Zc to have a moving speed set in advance (Step S3).

In this constant speed travel zone Zc, the moving speed and the movement position of the movable platen 4m are detected. Based on the detected moving speed and movement position, the completion point (Xs) of the constant speed travel zone at which the moving speed is zero at the virtual stop position Xes is calculated that is sequentially predicted by calculation for each predetermined time interval. The completion point (Xs) of the constant speed travel zone Zc is set as the deceleration start point Xs. Specifically, the distance Ld of the deceleration zone Zd is estimated as Ld=(moving speed □ movement time)/2. Thus, when a condition that (Xes−Ld)≤movement position is reached, it is determined that the deceleration start point (deceleration start position) Xs is reached.

When the deceleration start position Xs is reached, then the processing proceeds to the deceleration zone Zd. First, the meter-in circuit 5 starts the suppression (throttle) of the flow rate (Steps S4 and S5). In this deceleration zone Zd, the movement position of the movable platen 4*m* (the movable mold 4*cm*) is sequentially detected at a fixed sampling interval to calculate the moving speed based on the detected movement position (Steps S6 and S7). The moving speed (speed instruction value) as a target at the detected movement position is calculated based on the above-described speed control pattern Dp to subject the meter-in circuit 5 to the meter-in control so that the actual moving speed at this movement position is the target moving speed (Step S8). Specifically, the hydraulic pump 2*s* is subjected to the flow rate control to thereby control the moving speed. As described above, the speed instruction (speed instruction value) is calculated from the detected movement position of the movable platen 4*m* based on the speed control pattern Dp. This allows the speed control pattern Dp to be accurately traced during the movement control including deceleration, thus always setting an accurate speed instruction having little fluctuation.

The speed instruction value Dm in this case can be calculated by the following [formula 1]. In [formula 1], Xrs denotes a deceleration switching position (Xc in FIG. 7), Xd denotes a detected movement position, Vds denotes a moving speed at the deceleration start position Xs, Td denotes the movement time between the deceleration zones, and Vm denotes the moving speed (speed instruction value) prior to the deceleration.

$$Dm = \sqrt{\frac{2 \cdot |Xrs - Xd|}{Vds \cdot Td}} \cdot Vm \qquad \text{formula 1}$$

In the deceleration zone Zd, a deviation between the actual moving speed at the movement position and the moving speed (speed instruction) as a target is detected. Based on this deviation, the flow rate control valve 13 is subjected to the feedback control (PID control). Specifically, the deviation-based control instruction is given to the flow rate control valve 13 constituting the meter-out circuit 6 to perform the suppression control for a case where the moving speed is excessively high in particular (Step S9).

In this case, the control output (operation amount) Do given to the flow rate control valve 13 is obtained from [formula 2]. In [formula 2], SV denotes a set value (target speed), PVt denotes a detected moving speed, et denotes deviation (SV-PVt), Kp denotes a proportional gain, Ti denotes an integral time, and Td denotes a differential time.

$$Do = Kp \left( et + \frac{1}{Ti} \cdot \int et \cdot dt - Td \cdot \frac{d}{dt} PVt \right) \qquad \text{formula 2}$$

As a result, the moving speed of the movable platen 4*m* is subjected to a so-called bidirectional compound control composed of a flow rate control (open loop control) based on the speed control pattern Dp using the meter-in circuit 5 at the inflow side of the mold opening/closing cylinder 3*c* . . . and a feedback control (closed loop control) using the meter-out circuit 6 at the outflow side of the mold opening/closing cylinder 3*c* . . . . Thus, the deceleration processing is performed by accurately tracing the deceleration travel zone Zc in the speed control pattern Dp shown in FIG. 7.

When the moving speed declines to a low speed of about 10 to 60 [%] of the moving speed of the constant speed travel zone Zc (i.e., when the switching position shown by Xc in FIG. 7 is reached), the deceleration travel zone Zd is completed and the processing proceeds to the mold clamping step as a subsequent step (Steps S10, S11, and S12). In this example, the virtual stop position Xes was set as the stop position Xe and the switching position Xc at which the deceleration travel zone Zd was completed was the target position Xo. However, this switching position Xc also may be set as a regular stop position Xe at which the movable platen 4*m* is actually stopped. Thus, when the stop position Xe is set as the virtual stop position Xes, the target position Xo is different from the stop position Xe. When the stop position Xe is set as an actual regular stop position Xe on the other hand, the target position Xo is the same as the stop position Xe. This target position Xe is the mold opening position or the mold closing position in this embodiment.

As described above, the regular stop position Xe or the virtual stop position Xes can be included as the stop position Xe. Thus, this can be applied to a general stop processing to provide a versatile stop control. The use of the virtual stop position Xes can provide the prediction of the accurate target position Xo during the movement on a real-time basis. Thus, the target position Xo can be reached more accurately, thus providing diversified deceleration controls.

In particular, the use of the virtual stop position Xes enables the deceleration start point Xs to set a predetermined speed control pattern Dp in advance. The predetermined speed control pattern Dp includes a constant speed travel zone Zc in which the movable unit 4 is moved at a set moving speed, a deceleration travel zone Zd in which the speed is gradually reduced from the completion point (Xs) of this constant speed travel zone Zc, and a target position Xo at which this deceleration travel zone Zd is completed. In the actual constant speed travel zone Ze, the movable unit 4 is allowed to move at the set moving speed. Based on the detected moving speed and the movement position, the completion point (Xs) of the constant speed travel zone Zc can be set as the deceleration start point Xs. The completion point (Xs) of the constant speed travel zone Zc is a point at which the moving speed is zero at the virtual stop position Xes sequentially predicted by calculation for each predetermined time interval. This can consequently improve the control accuracy for the target position Xo and can dramatically reduce the fluctuation of the position and time of the movement of the movable unit 4. This can avoid, even when the movable unit 4 has a higher speed, troubles such as the overrun of the movable unit 4 and can eliminate a factor causing a declined molding quality (homogenization) and a factor causing a variation of the productivity. Furthermore, since this can be realized by software processing, there is no need for additional hardware such as a brake bulb required for a braking operation or a related circuit element. This can advantageously contribute to a hydraulic circuit having a reduced cost and a simpler and smaller circuit configuration.

Figure 8:
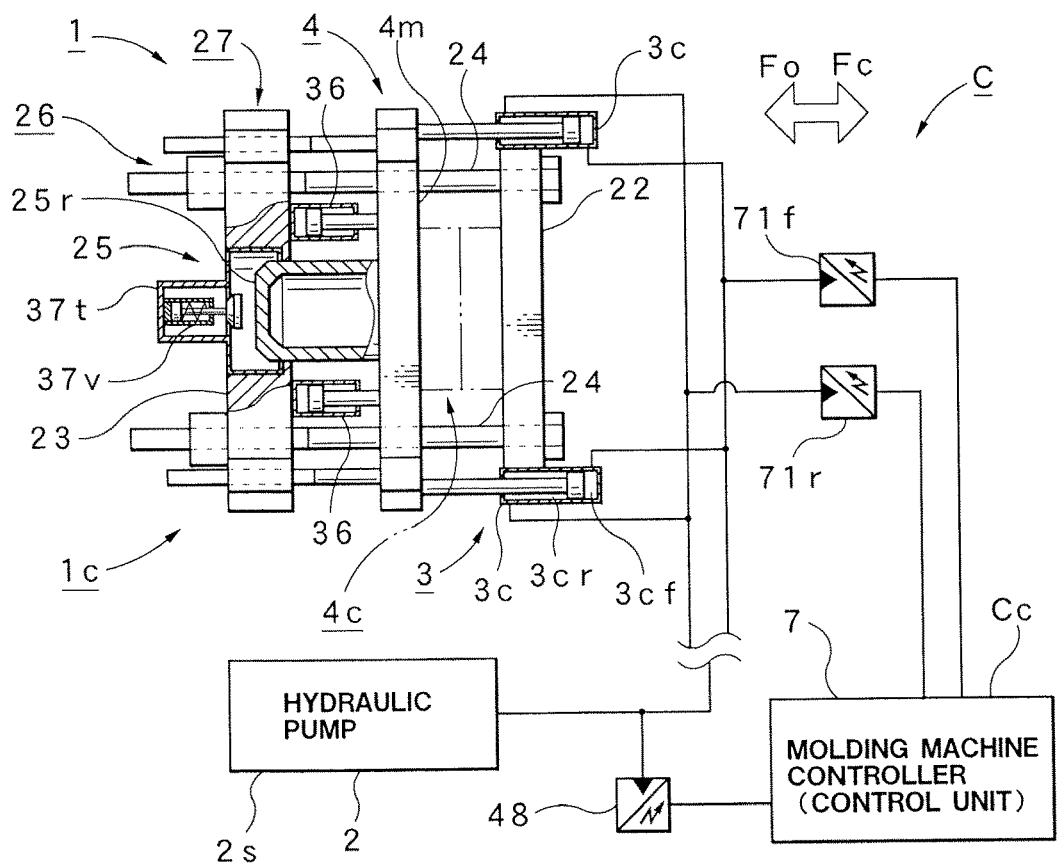
FIG. 8 is a hydraulic circuit diagram illustrating the main part of a drive control apparatus according to a modification example of the hydraulic injection molding machine.
Figure 9:
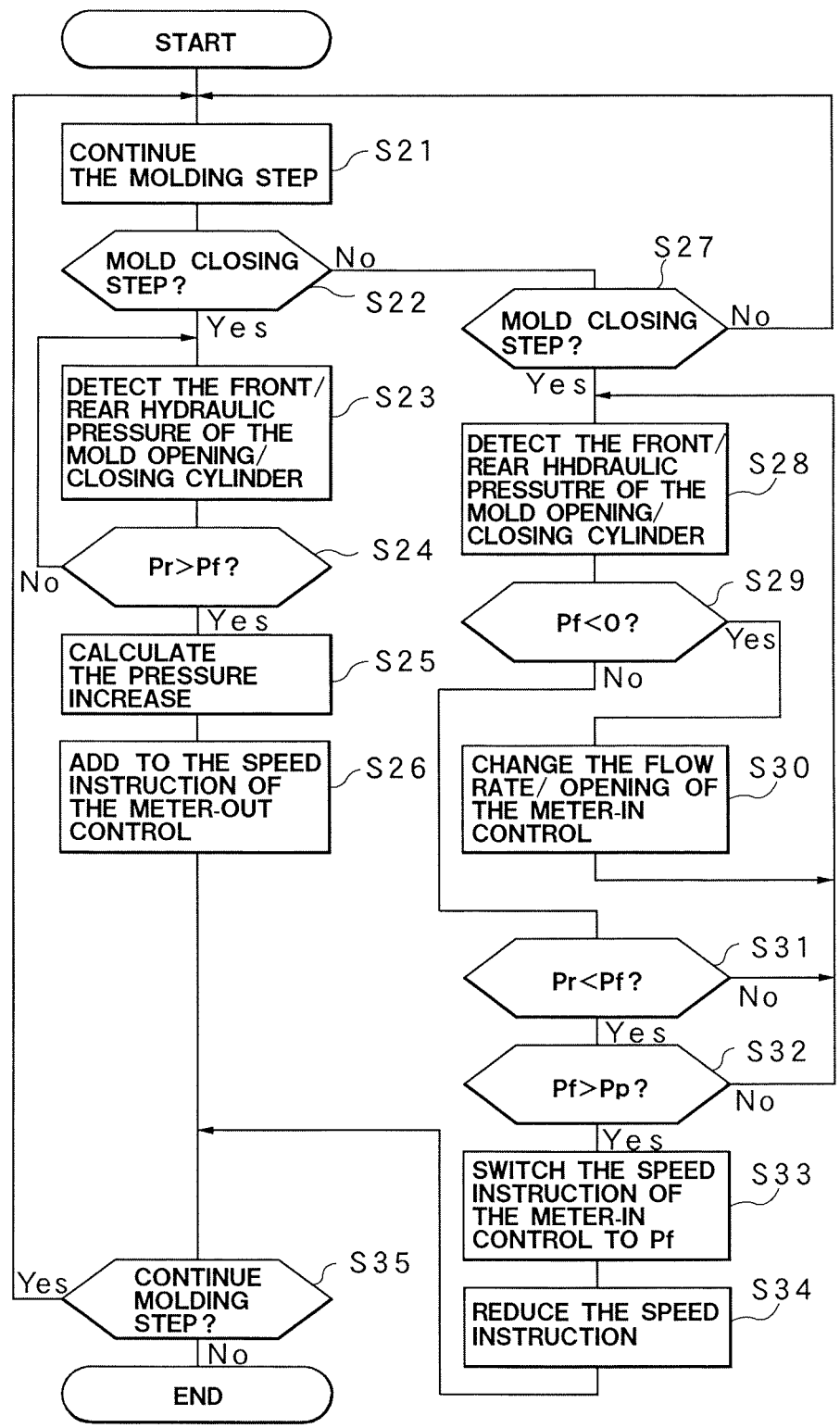
FIG. 9 is a flowchart for explaining the processing procedure of the control method of the drive control apparatus according to the modification example.

Next, the following section will describe the control method according to the modification example of this embodiment and the drive control apparatus C with reference to FIG. 8 and FIG. 9.

FIG. 8 is a hydraulic circuit diagram illustrating the main part of the drive control apparatus C according to the modification example. The drive control apparatus C according to the modification example is configured so that the hydraulic circuit 51 of the drive control apparatus C as a basic configuration shown in FIG. 2 is connected to a hydraulic sensor 71f that detects the hydraulic pressure Pf of the front oil chamber 3cf . . . in the mold opening/closing cylinders 3c, 3c and a hydraulic sensor 71r that detects the hydraulic pressure Pr of the rear oil chamber 3cr . . . in the mold opening/closing cylinders 3c, 3c. The respective hydraulic sensors 71f and 71r are connected to the control unit 7 (the molding machine controller Cc). The reference numeral 48 denotes the above-described pump pressure sensor (discharge pressure sensor) that has a function to detect the discharge pressure Pp of the hydraulic pump 2s to give the discharge pressure Pp to the control unit 7. According to the modification example, the control is performed to monitor the hydraulic pressures Pf and Pr and the discharge Pp shown above. Thus, the hydraulic circuit 51 in another drive control apparatus C not shown in FIG. 8 has the same configuration as that of FIG. 2. Thus, the same parts in FIG. 8 as those of FIG. 2 are denoted with the same reference numerals to clearly show the configurations and the details will not be further described.

FIG. 9 is a flowchart to explain the processing procedure of the control method of the drive control apparatus C according to the modification example.

It is assumed that a predetermined product is continuously subjected to the molding step in the hydraulic injection molding machine 1 (Step S21). Then, the processing proceeds to the mold opening step to assume a case where the mold opening step is performed (Step S22). In the mold opening step, the above-described control processing based on the flowchart shown in FIG. 1 is performed. In the mold opening step, based on the control method according to the modification example, the hydraulic pressure Pf of the front oil chamber 3cf . . . in the mold closing direction Fc of the mold opening/closing cylinder 3c . . . and the hydraulic pressure Pr of the rear oil chamber 3cr . . . in the mold opening direction Fo of the mold opening/closing cylinder 3c . . . are detected to allow the control unit 7 to monitor the magnitudes of the hydraulic pressures Pf and Pr (Step S23). When the hydraulic pressure Pr of the rear oil chamber 3cr . . . is higher than the hydraulic pressure Pf of the front oil chamber 3cf . . . during the mold opening operation (i.e., when Pr>Pf is established), a differential pressure of the hydraulic pressures Pr and Pf is calculated (Steps S24 and S25). Then, a control is performed in which a speed instruction having a magnitude corresponding to the calculated differential pressure of the hydraulic pressures Pr and Pf is added to the feedback control speed instruction based on the meter-out control (Step S6). This can consequently eliminate the unnecessary differential pressure caused in the rear oil chamber 3cr . . . during the mold opening, thus avoiding troubles such as the damage of the mold opening/closing cylinder 3c . . . and suppressing a rapid behavior change.

On the other hand, a case is assumed where the processing proceeds to the mold closing step and the mold closing step is performed (Step S27). The mold closing step similarly performs the above-described control processing based on the flowchart shown in FIG. 1. In the mold opening step, based on the control method according to modification example, the hydraulic pressure Pf of the front oil chamber 3cf . . . in the mold closing direction Fc of the mold opening/closing cylinder 3c . . . , the hydraulic pressure Pr of the rear oil chamber 3cr . . . in the mold opening direction Fo of the mold opening/closing cylinder 3c . . . , and the discharge pressure Pp of the hydraulic pump 2 are detected. The control unit 7 is allowed to monitor the magnitudes of the hydraulic pressures Pf and Pr and the magnitude of the discharge pressure Pp of the hydraulic pump 2 (Step S28). When the hydraulic pressure Pf of the front oil chamber 3cf . . . has a negative pressure during mold closing operation (i.e., when Pf<O is established), a control is performed to increase then the flow rate in the meter-in control and to reduce the opening in the meter-in control (Steps S29 and S30). This can consequently solve the temporal increase or decrease of the flow rate due to the negative pressure, thus avoiding a defect in which the movable platen 4m during the movement is undesirably stopped for example.

When the hydraulic pressure Pf of the front oil chamber 3cf . . . is higher than the hydraulic pressure Pr of the rear oil chamber 3cr . . . during the mold closing operation (i.e., when Pr<Pf is established) (Step S31) and when the hydraulic pressure Pf of the front oil chamber 3cf . . . is higher than the discharge pressure Pp of the hydraulic pump 2 (i.e., when Pr>Pf is established) (Step S32), then the pressure instruction in the pressure control loop of the meter-in control is switched to have the magnitude of the hydraulic pressure Pf of the front oil chamber 3cf . . . . A control is performed to reduce the speed instruction to the unnecessary differential pressure caused in the front oil chamber 3cf . . . during the mold closing (Steps S33 and S34), thus solving a defect in which an excessively-high load causes an insufficient drive force.

When the above pressure difference does not occur or is solved, the molding step is continuously performed based on the flowchart shown in FIG. 1 described above (Step S35).

As described above, according to the control method of the hydraulic injection molding machine according to this embodiment, as a basic approach, when the deceleration start point Xs is reached, the meter-in side of the mold opening/closing cylinders 3c, 3c (the hydraulic driving actuator 3) is subjected to the flow rate control to thereby start the deceleration control processing. Then, the movement position of the movable platen 4m (the movable unit 4) supporting the movable mold 4cm is detected to use a speed instruction corresponding to the movement position to subject the mold opening/closing cylinders 3c, 3c to the meter-in control. The movement position of the movable platen 4m is detected to calculate the moving speed of the movable platen 4m. Based on the speed instruction, the moving speed is subjected to the feedback control using the meter-out control to the mold opening/closing cylinders 3c, 3c. Thus, by improving the control accuracy and stability to the target position Xo related to the movement of the movable unit 4, the molding quality is improved. At the same time, the deceleration processing can be performed at a higher speed during the movement of the movable platen 4m to thereby reduce the molding cycle. The productivity and mass productivity can be improved. A load related to the movement of the movable platen 4m in particular can be reduced, thereby improving the energy saving.

As described above, the preferred embodiment including the modification example has been described in detail. However, the present invention is not limited to such an embodiment. An arbitrary change, addition, or deletion can be made in the configuration, shape, material, number, or value, for example, in the details within a scope not deviating from the intention of the present invention.

For example, as the movable unit support mechanism 11, the support face 11f for supporting the movable unit 4 in a directly slidable manner by the contact state and the linear guide mechanism 11r for supporting the movable unit 4 in a slidable and displaceable manner have been illustrated. However, the movable unit support mechanism 11 using other configurations such as a configuration using a roller also may be used. As the meter-out circuit 6, the flow rate control valve 13 has been illustrated. However, other hydraulic circuit components that can realize a similar meter-out control can be used as a substitute. Furthermore, the variable discharge-type hydraulic pump 2s has been illustrated as the hydraulic pump 2. However, other types of hydraulic pumps 2 are not excluded. Thus, in this case, the meter-in circuit 5 can be configured as another hydraulic circuit. For an easy understanding of the invention, the speed control pattern Dp has been illustrated as the simplest pattern. However, various patterns including a complicated pattern also may be used.

INDUSTRIAL APPLICABILITY

The present invention can be applied to a control method and a drive control apparatus of various hydraulic driving actuators including a mold clamping apparatus in a hydraulic injection molding machine, an injection apparatus, or an ejector apparatus.

The invention claimed is:

1. A control method of a hydraulic injection molding machine, comprising the steps of:
    using a hydraulic pump to drive a hydraulic driving actuator to move a movable unit;
    when a deceleration start point is reached during a movement of the movable unit, performing a deceleration control processing to stop the movable unit at a set stop position;
    when a set target position is reached, performing a deceleration completion processing;
    when the deceleration start point is reached, then subjecting a meter-in side of the hydraulic driving actuator to a flow rate control to thereby start the deceleration control processing;
    detecting a movement position of the movable unit;
    calculating a speed of the movable unit;
    calculating a value for a speed instruction corresponding to the movement position to subject the hydraulic driving actuator to a meter-in control; and
    based on a difference between the calculated speed of the movable unit and the speed instruction, subjecting the movable unit to a feedback control based on a meter-out control to the hydraulic driving actuator.

2. The control method of the hydraulic injection molding machine according to claim 1, wherein: the hydraulic driving actuator uses a mold opening/closing cylinder of a mold clamping apparatus and the movable unit uses a movable platen for supporting a movable mold in the mold clamping apparatus.

3. The control method of the hydraulic injection molding machine according to claim 1, wherein: the movable unit is in a load state in which a load having a magnitude based on a moving resistance related to the movement is equal to or lower than a predetermined magnitude.

4. The control method of the hydraulic injection molding machine according to claim 1, wherein: the stop position includes an actual stop position or a virtual stop position.

5. The control method of the hydraulic injection molding machine according to claim 4, wherein: the deceleration start point sets a predetermined speed control pattern in advance, the predetermined speed control pattern including a constant speed travel zone in which the movable unit is moved at a set moving speed, a deceleration travel zone in which the speed is gradually reduced from the completion point of this constant speed travel zone, a target position at which this deceleration travel zone is completed, in the constant speed travel zone, the movable unit is allowed to move at the set moving speed and, based on the detected speed and the movement position, a completion point of the constant speed travel zone at which a moving speed becomes zero at a virtual stop position is set as the deceleration start point.

6. The control method of the hydraulic injection molding machine according to claim 5, wherein: the speed instruction is calculated from the movement position of the detected movable unit based on the speed control pattern.

7. The control method of the hydraulic injection molding machine according to claim 2, wherein: the hydraulic pressure of a front oil chamber in a mold closing direction of the mold opening/closing cylinder and the hydraulic pressure of a rear oil chamber in a mold opening direction of the mold opening/closing cylinder are monitored and, when the hydraulic pressure of the rear oil chamber is higher than the hydraulic pressure of the front oil chamber during a mold opening operation, a control is performed to add, to the feedback control speed instruction based on the meter-out control, a speed instruction having a magnitude corresponding to a differential pressure between the hydraulic pressure of the rear oil chamber and the hydraulic pressure of the front oil chamber.

8. The control method of the hydraulic injection molding machine according to claim 2, wherein: the hydraulic pressure of a front oil chamber in a mold closing direction of the mold opening/closing cylinder, the hydraulic pressure of a rear oil chamber in a mold opening direction of the mold opening/closing cylinder, and a discharge pressure of the hydraulic pump are monitored and, when the hydraulic pressure of the front oil chamber is higher than the hydraulic pressure of the rear oil chamber and the hydraulic pressure of the front oil chamber is higher than the discharge pressure of the hydraulic pump during mold closing operation, a control is performed to switch a pressure instruction in a pressure control loop of the meter-in control to have a magnitude of the hydraulic pressure of the front oil chamber.

9. The control method of the hydraulic injection molding machine according to claim 2, wherein: the hydraulic pressure of a front oil chamber in a mold closing direction of the mold opening/closing cylinder is monitored and, when the hydraulic pressure is a negative pressure, a control is performed to increase a flow rate in the meter-in control and a control is performed to reduce an opening in the meter-in control.

10. The control method of the hydraulic injection molding machine according to claim 2, wherein: the movable unit is in a load state in which a load having a magnitude based on a moving resistance related to the movement is equal to or lower than a predetermined magnitude.

11. The control method of the hydraulic injection molding machine according to claim 1, wherein: the speed instruction is calculated from the detected position of the movable unit, target stop position and calculated speed of the movable unit.

12. A drive control apparatus of a hydraulic injection molding machine, wherein: a hydraulic pump is used to drive a hydraulic driving actuator to move a movable unit, when a deceleration start point is reached during the movement of the movable unit, a deceleration control processing is performed to stop the movable unit at a set stop position and, when a set target position is reached, a deceleration completion processing is performed, the drive control apparatus comprising:
    a meter-in circuit connected to the hydraulic driving actuator;

a meter-out circuit connected to the hydraulic driving actuator; and a control unit configured to:

perform, when the deceleration start point is reached, a flow rate control on the meter-in circuit to the hydraulic driving actuator to thereby start a deceleration control processing and detect the detect a movement position of the movable unit;

calculate a speed of the movable unit;

calculate a value for a speed instruction corresponding to the movement position to perform a meter-in control to the meter-in circuit and, based on a difference between the calculated speed of the movable unit and the speed instruction, subject the movable unit to a feedback control based on a meter-out control to the meter-out circuit.

13. The drive control apparatus of the hydraulic injection molding machine according to claim 12, wherein: the hydraulic driving actuator uses a mold opening/closing cylinder of a mold clamping apparatus and the movable unit uses a movable platen for supporting a movable mold in a mold clamping apparatus.

14. The drive control apparatus of the hydraulic injection molding machine according to claim 13, wherein: the mold clamping apparatus has a movable unit support mechanism that supports the movable unit in a load state with a load having a magnitude based on a moving resistance related to the movement to have a magnitude equal to or lower than a predetermined magnitude.

15. The drive control apparatus of the hydraulic injection molding machine according to claim 14, wherein: the movable unit support mechanism has a support face to support the movable unit.

16. The drive control apparatus of the hydraulic injection molding machine according to claim 14, wherein: the movable unit support mechanism has a linear guide mechanism to support the movable unit in a slidable and displaceable manner.

17. The drive control apparatus of the hydraulic injection molding machine according to claim 12, wherein: the meter-out circuit has a flow rate control valve that can variably control the flow rate by a meter-out control.

18. The drive control apparatus of the hydraulic injection molding machine according to claim 12, wherein: the hydraulic pump is a variable discharge-type hydraulic pump for which a rotation speed of a pump motor can be changed to thereby control a discharge flow rate.

19. The drive control apparatus of the hydraulic injection molding machine according to claim 12, wherein: the speed instruction is calculated from the detected position of the movable unit, target stop position and calculated speed of the movable unit.

* * * * *